United States Patent [19]

Barfield

[11] Patent Number: 4,727,242
[45] Date of Patent: Feb. 23, 1988

[54] ELECTROFUSION COUPLER

[75] Inventor: Malcolm R. Barfield, Willenhall, England

[73] Assignee: Glynwed Tubes & Fittings Ltd., Staffordshire, England

[21] Appl. No.: 921,329

[22] Filed: Oct. 21, 1986

[30] Foreign Application Priority Data

Oct. 24, 1985 [GB] United Kingdom ............... 8526235

[51] Int. Cl.$^4$ .................... H05B 3/58; H05B 3/44
[52] U.S. Cl. ................................ 219/535; 219/544
[58] Field of Search ...................... 219/535, 544; 156/380.1, 379.7; 285/21

[56] References Cited

U.S. PATENT DOCUMENTS 4,117,311  9/1978  Strum ........................... 219/544

FOREIGN PATENT DOCUMENTS 2848382  3/1980  Fed. Rep. of Germany .
2497916  7/1982  France .
0055891  7/1982  United Kingdom .

Primary Examiner—Harold Broome
Attorney, Agent, or Firm—Arnold B. Silverman

[57] ABSTRACT

An electrofusion coupler sleeve for use in connecting together two plastics pipes by fitting the ends into opposite ends of the sleeve and passing an electric current through a resistance heater embedded in the sleeve adjacent its inner surface to fuse together the pipes and the sleeve, incorporates visual indicating means for indicating if the electrical energy supplied has been adequate for proper fusing. The indicating means takes the form of a blind bore extending into the sleeve from the exterior towards the interior. When, in use, the heater is energized, if the electrical energy supplied has been adequate for proper fusing, the softened flowable plastics material is forced, by the pressure produced by heating and fusing, to rise within the blind bore and project from the outer surface of the sleeve. The sleeve may comprise an inner plastics layer of a color contrasting with that of the outer layer, so that, if fusing has been adequate, the contrasting material of the inner layer projects, from the blind bore, above the material of the outer layer.

2 Claims, 7 Drawing Figures

ELECTROFUSION COUPLER

BACKGROUND OF THE INVENTION

This invention relates to an electrofusion coupler for use in the construction of thermoplastics pipe systems wherein a welded joint between adjoining ends of adjoining sections of plastics pipe, or of such a pipe section and a tubular member forming part of the pipe fitting, valve or the like, is obtained by forcing such adjoining ends into such an electrofusion coupler and energising the same.

Such an electrofusion coupler takes the form of a sleeve of thermoplastics material having an electrical resistance heater embedded therein and extended around the sleeve. When adjoining pipe ends or the like are forced into the sleeve from opposite ends and the resistance heating wire, and thus the sleeve, is subsequently heated by passing an electric current through the wire, both the material of the sleeve and the material of the inserted pipe ends or the like are locally softened and fused, whereby an intimate connection is obtained, in the form of a welded join which, when the assembly has cooled, is leak tight to fluids. The coupler remains in situ forming a permanent part of the joint.

Typically, the electrical resistance wire takes the form of coil embedded in the thermoplastics sleeve and coaxial therewith, the wire lying close to the inner surface of the sleeve, the ends of the wire being connected to terminal points, exposed on the exterior of the sleeve for connection to a source of electrical current.

In the construction of thermoplastics pipe systems using electrofusion couplers of this kind, it is desirable to have some reliable yet inexpensive means for determining whether the interior of the sleeve, and the inserted pipe end or the like have been sufficiently heated to afford a good welded joint or whether it is necessary to re-make the joint.

SUMMARY OF THE INVENTION

It is an object of the present invention to provide an electrofusion coupler having simple and reliable means for indicating when the conditions for forming a satisfactory welded joint between the pipe ends or the like inserted in the coupler have been achieved, and which means does not detract from the effectiveness or integrity of the coupler.

According to one aspect of the invention, there is provided an electrofusion coupler comprising a sleeve of thermoplastics material having embedded therein, near to the inner surface thereof, an electrical resistance heater extended around the circumference of the sleeve, the coupler having visual indicating means afforded by at least one blind bore extending into the sleeve from the exterior thereof, the spacing of the inner end of said bore from the inner surface of the sleeve, and the diameter of the said bore, being so selected that in use, when the free ends of two thermoplastics pipe sections to be joined together are fitted closely within the sleeve and the electrical resistance heater is supplied with electrical current to fuse the region of the sleeve adjacent the pipe sections and the outer surfaces of the pipe sections together, if the energy supplied has been adequate to effect proper fusing, the softened flowable plastics material is urged by the pressure produced by heating and fusing the same to rise within said bore to project from the outer surface of the sleeve.

According to another aspect of the invention there is provided an electrofusion coupler comprising a sleeve of thermoplastics material incorporating an inner layer of thermoplastics material of a first colour, an electrical resistance heater extended around the inner layer, and an outer layer of thermoplastics material of a contrasting colour extending around the inner layer and said electrical resistance heater, the coupler having a visual indicator afforded by at least one blind bore extending into the sleeve from the exterior thereof, the spacing of the inner end of said bore from the inner surface of the sleeve, and the diameter of the said bore, being so selected that in use, when the free ends of two thermoplastics pipe sections to be joined together are fitted closely within the sleeve and the electrical resistance heater is supplied with electrical current to fuse the region of the sleeve adjacent the pipe sections and the outer surfaces of the pipe sections together, if the energy supplied has been adequate to effect proper fusing, the softened flowable plastics material is urged by the pressure produced by heating and fusing the same to rise within said bore to project from the outer surface of the sleeve and the projecting material is of said first colour, contrasting with said second colour.

Embodiments of the invention are described below by way of example, with reference to the accompanying drawings.

DESCRIPTION OF THE PREFERRED EMBODIMENT

Figure 1:
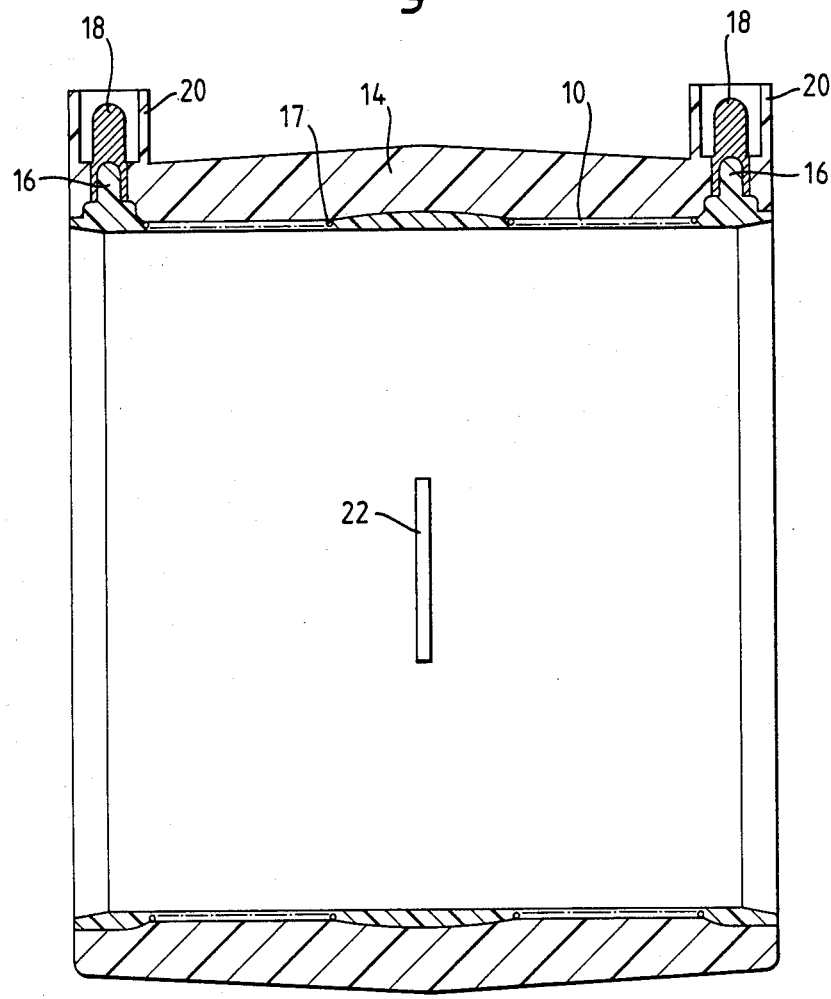
FIG. 1 is a view in axial section through an electrofusion coupler embodying the invention.

Referring to FIG. 1, an electrofusion coupler takes the form of a substantially cylindrical sleeve comprising an inner layer 10 of thermoplastics material, a coil of electrical resistance heating wire wound round the sleeve 10 from adjacent one end thereof to the other end thereof and an outer layer 14 of thermoplastics material surrounding the inner layer 10 and the coil of heating wire. The ends of the coil of heating wire are wrapped around pegs 16 integral with the inner layer and over which are fitted, in good electrical contact with the wrapped ends of the heating wire, terminal plugs 18 located within cylindrical sockets 20 formed integrally with the outer layer 14. Midway along the sleeve, formations 22 project inwardly to act as stops for the ends of inserted pipe sections.

In use, the ends of two pipe sections to be united using the connector are inserted into the sleeve from the opposite ends thereof until the pipe sections engage the stops 22. There are then inserted into the sockets 20, to make electrical contact with the plugs 18, respective electrical connectors by which electrical current is passed through the resistance wire for a predetermined period of time. As a result of the heating effect of the electrical current, the resistance wire fuses the adjoining material of the inner and outer sleeve and ultimately the material of the peripheries of the pipe sections inserted in the connector are melted or fused so that the pipe sections are welded to the connector and are thus sealingly connected with one another.

In order to allow a straightforward check to be made that the welding has, in all probability, been effected satisfactorily, visual indicating means is provided, as discussed below.

Figure 4:
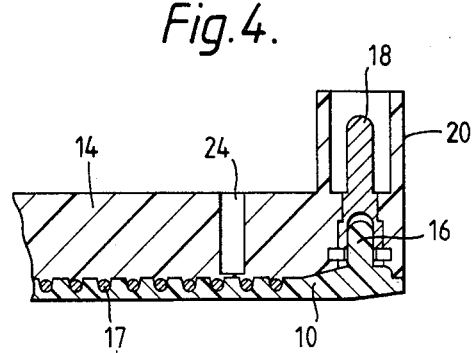
FIG. 4 is a fragmentary detailed view in section along a line D—D in FIG. 3.
Figure 5:
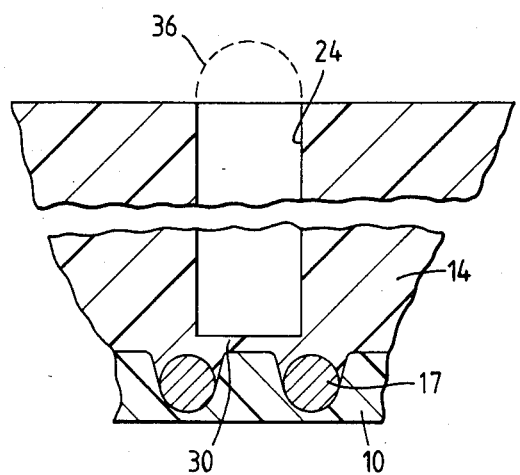
FIG. 5 is a sectional view, to an enlarged scale showing part of FIG. 4.
Figure 6:
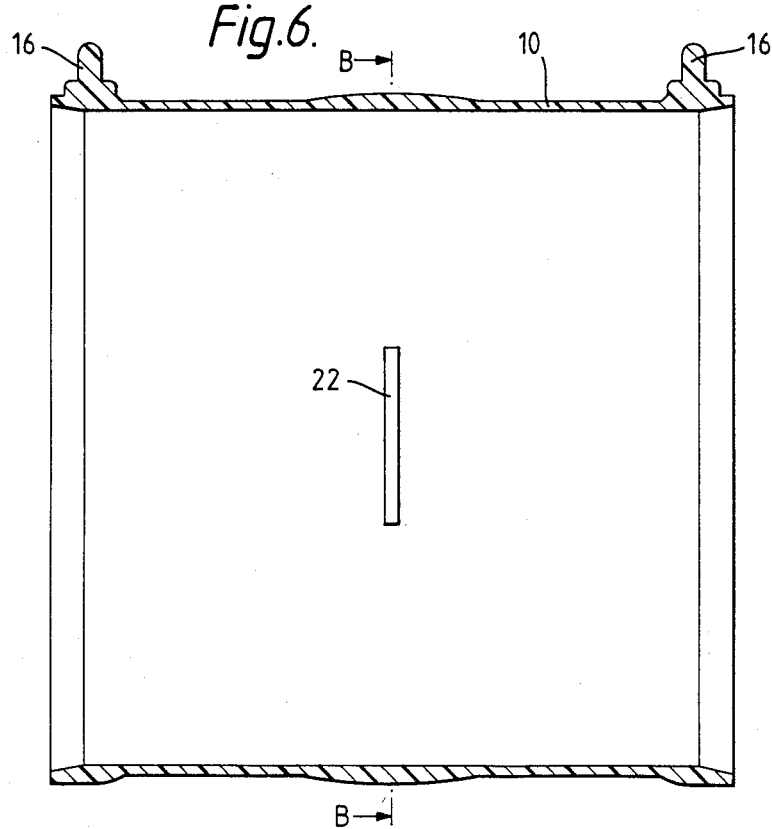
FIGS. 6 and 7 are respectively an axial sectional view and end elevation view of an inner layer forming part of the coupler of FIGS. 1 and 2.
Figure 7:
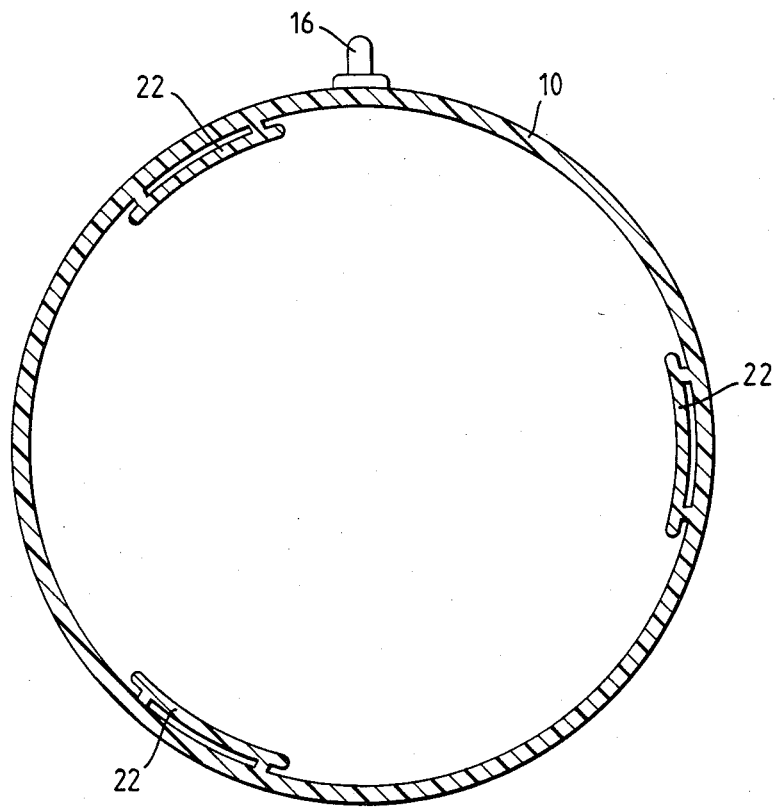

The coupler is manufactured as follows. Firstly, as illustrated in FIG. 6, the inner layer 10 is formed as a thermoplastics moulding taking the form of a thin sleeve of thermoplastics material having, projecting radially adjacent to either end thereof, respective pegs 16. The thin sleeve forming the inner layer is then wound with the resistance heating wire to provide a helical winding extending from adjacent the inner side of one peg 16 to adjacent the inner side of the other. During such winding, the resistance heating wire is continuously heated, by passing electric current therethrough, and as a result, by virtue of the tension exerted on the wire during the winding, the wire becomes embedded in the outer part of the inner sleeve, effectively forming a helical groove to accommodate itself, as shown in FIGS. 4 and 5, where the wire is indicated at 17. The ends of the wire 17 are then wrapped around the respective pegs 16 and the plugs 18 are fitted over the wrapped pegs 16 and so secured as to ensure good electrical contact between the wire ends 4 and the plugs 18. The electrical connection between the ends of the resistance heating wire 17 and the plugs 18 may be effected by electrical resistance welding or by crimping the tubular lower end portions of the plugs 18 which receive the pegs 16 or by any other appropriate method. The manner in which the resistance heating wire is wrapped on the sleeve ensures that adjacent turns of the coil can be made to lie in close proximity to one another but are nevertheless insulated electrically from one another and are held in position by the plastics material between adjacent grooves formed by the wire during the winding process. Finally, the wound inner sleeve is fitted within an appropriate mould and the outer layer 14 moulded therearound, together with the sockets 20. In moulding the outer layer, two blind bores 24 are also moulded extending from the outer surface of the outer layer to adjacent the inner layer (see FIG. 5) so that a thin diaphragm or web 30 of the plastics material of the outer layer is provided at the bottom of each bore. When, during the connection of two pipe sections or the like using the electrofusion coupler, current is passed through the electrical resistance winding until it heats the adjoining plastics material to above its fusion temperature, the thermoplastics material, in particular that of the inner sleeve 10 and the adjacent surface portions of the inserted pipe ends, starts to expand so that substantial pressure is developed within the region of the fused and melted thermoplastics material and this also serves to ensure that a good weld is made. If an appropriate temperature for good welding has been achieved, this pressure is sufficient to rupture the diaphragms 30 and to cause the fused and molten plastics material to be forced upwardly through the blind bores 24 to project in a bulb or dome therefrom as indicated in broken lines at 36 in FIG. 5.

Normally the outer layer 14 will also be a thermoplastics material and may be of substantially the same composition as the inner sleeve and thus, when the material of the inner layer has become fused, the material of the outer layer, which closely adjoins the inner layer, and including the diaphragm will also have become fused or softened to some extent. Thus, the diaphragm 30 will have softened and become partially fused by the time that the material of the inner sleeve has become fused and pressurised, and as a result, the material of the diaphragm 30 will rise within the bore 24 with the overlying material of the sleeve 10 forming an outer layer of the rising plug of plastics. In this case the rupture of the diaphragm will effectively arise partially from a thinning of the diaphragm and the actual rupture may not take place until the rising plastics material has reached or almost reached the outer end of the bore 24.

Preferably the inner layer 14 and outer layer 10 are of contrasting colours so that the workman using the coupler can determine, by the projection of the contrasting bulbs of colour above the outer surface of the outer layer, that a satisfactory weld has been achieved. However, it is possible for the inner sleeve and outer sleeve to be of the same colour, as the emergence of the bulbs of fused material from the inner layer through the bores is clearly detectable visually, although somewhat less striking if these bulbs are of the same colour as the outer material. The bores 24 may extend right through to the inner layer, so that instead of being closed at its inner end by a diaphragm of the material of the outer layer, each bore 24 is simply closed at its inner end by the inner layer 10, or each diaphragm 30 instead of extending completely across the inner end of the receptive bore 24 may have a central aperture exposing the inner layer.

Figure 2:
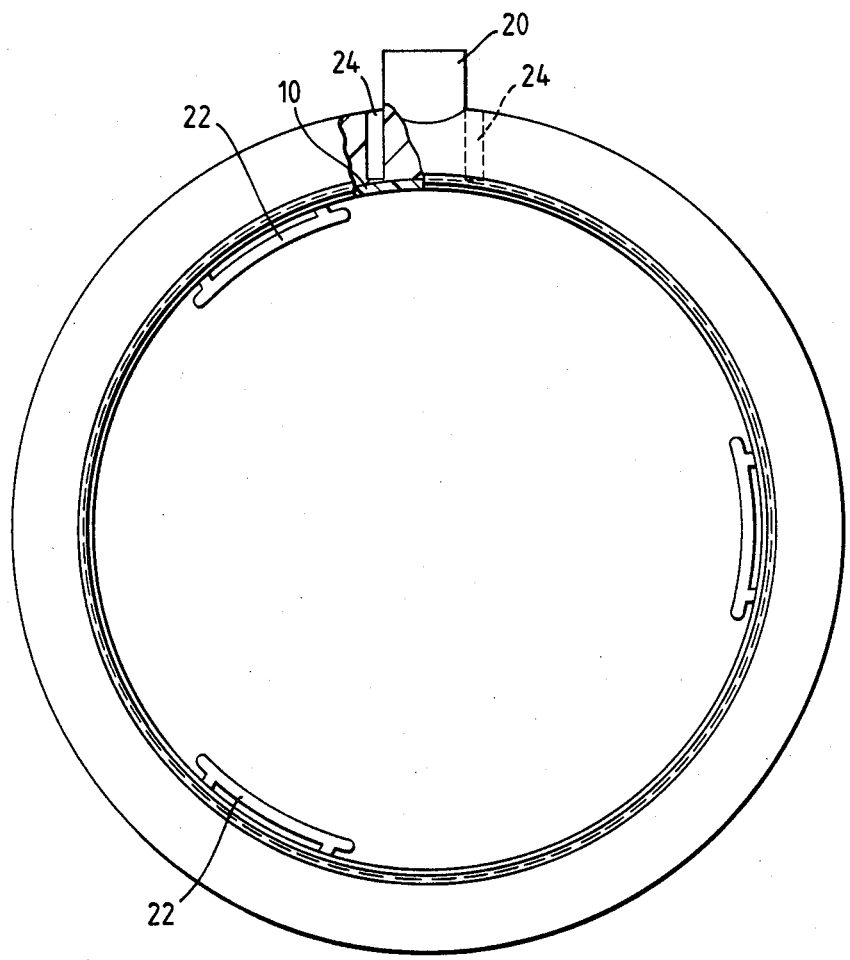
FIG. 2 is an end view, partly in cross section, of the coupler of FIG. 1.
Figure 3:
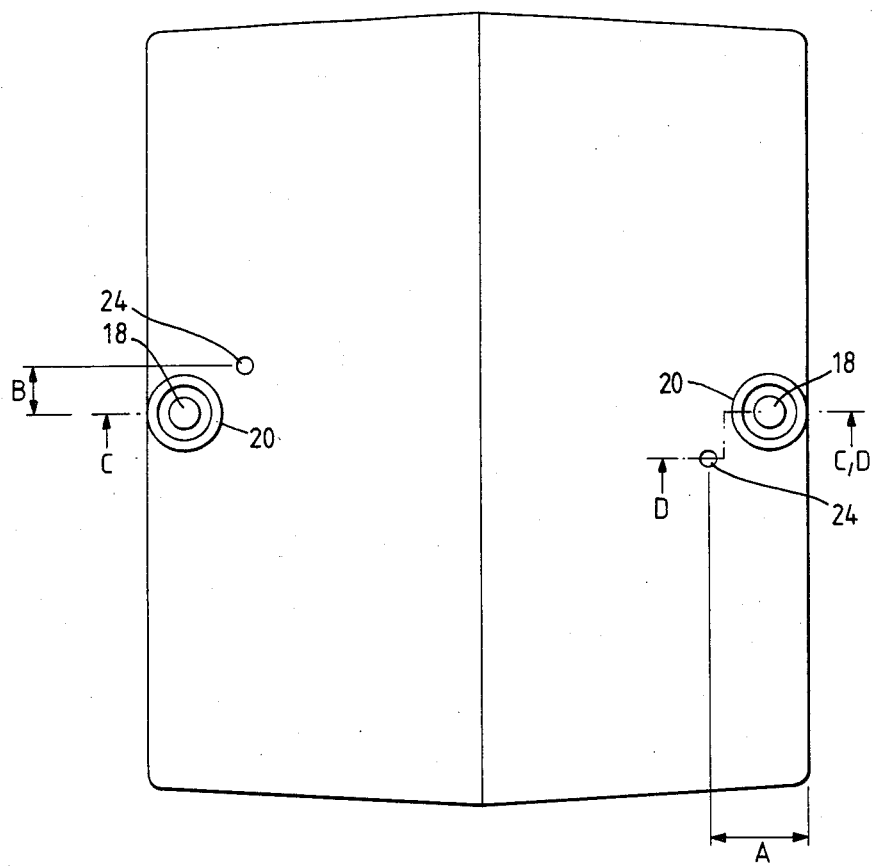
FIG. 3 is a plan view from above of the coupler of FIGS. 1 and 2.

Several variables affect the appropriate function of the indicator means referred to, such as the nature of the thermoplastics material involved, the size of the coupler, etc. However, it is envisaged that, typically, each bore 24 will be from 10 to 30 mm from the adjoining end of the coupler (dimension A in FIG. 3). It will be noted from FIG. 3 that the bores 24 are offset laterally from the central plane in which the plugs are located. This is simply for convenience of manufacture and to ensure that the bores are not obstructed by the electrical connections to the plugs in use. The amount of the offset (dimension B in FIG. 2) may vary from no offset at all to around 5 mm. The diameter of the bores 24 may vary from 1.5 mm to 6.5 mm for instance. Because the appropriate dimensions are interrelated with one another and with the coupler dimensions, the thermoplastics material used etc., the appropriate combination of dimensions etc., must be determined experimentally in each case and the dimensions suggested above are merely exemplary. Likewise the thickness of the diaphragm 30 will vary from coupler to coupler and the appropriate thickness may generally be determined experimentally.

What is claimed is:

1. An electrofusion coupler comprising a sleeve of thermoplastics material incorporating an inner layer of thermoplastics material of a first colour, an electrical resistance heater extended around the inner layer, and an outer layer of thermoplastics material of a contrasting colour extending around the inner layer and said electrical resistance heater, the coupler having a visual indicator afforded by at least one blind bore extending into the sleeve from the exterior thereof, the spacing of the inner end of said bore from the inner surface of the sleeve, and the diameter of the said bore, being so selected that in use, when two thermoplastics pipe sections having free ends which are to be joined together are fitted closely within the sleeve and the electrical resistance heater is supplied with electrical current to fuse the region of the sleeve adjacent the pipe sections and the outer surfaces of the pipe sections together, if the energy supplied has been adequate to effect proper fusing, a portion of the softened inner layer of thermoplastics material is urged by the pressure produced by heating and fusing the same to rise within said bore to project from the outer surface of the sleeve and the projecting material is of said first colour, contrasting with said second colour.

2. An electrofusion coupler according to claim 1, wherein said blind bore terminates in said outer layer, so that a thin diaphragm of the material of said outer layer at the bottom of said blind bore, is extended across the material of the inner layer, and the arrangement is such that, if, in use, conditions have been such as to secure good fusing between said free ends of said two thermoplastics pipe sections and the inner sleeve, the material of said outer layer originally forming said diaphragm extended across the inner end of said blind bore will be ruptured at some stage during the rising of said portion of the softened inner layer of thermoplastics material within or from said bore to expose to view the material of said inner layer whereby the material of the contrasting first colour will be exposed to view on the exterior of the sleeve.

* * * * *